US006836942B2

(12) United States Patent
Oleski

(10) Patent No.: US 6,836,942 B2
(45) Date of Patent: Jan. 4, 2005

(54) THIRD HAND STAND AND METHOD OF USING THE SAME

(76) Inventor: Robert M. Oleski, 18536 Sebring Rd., Fort Myers, FL (US) 33912

( * ) Notice: Subject to any disclaimer, the term of this patent is extended or adjusted under 35 U.S.C. 154(b) by 121 days.

(21) Appl. No.: 10/161,113

(22) Filed: Jun. 3, 2002

(65) Prior Publication Data
US 2003/0221303 A1 Dec. 4, 2003

(51) Int. Cl.[7] .......................... B25B 27/14; B25B 27/00; B23P 11/00; B60B 29/00
(52) U.S. Cl. ............................. 29/273; 29/271; 29/270; 29/434; 414/426
(58) Field of Search ........................... 29/428, 434, 700, 29/802, 273, 271, 270; 414/426, 427, 428; 254/120, 131

(56) References Cited

U.S. PATENT DOCUMENTS 5,348,438 A * 9/1994 Roberts ..................... 414/426
5,518,224 A * 5/1996 Anderson ................... 254/131
6,332,620 B1 * 12/2001 Mosher et al. ........... 280/47.24

* cited by examiner

Primary Examiner—John C. Hong
(74) Attorney, Agent, or Firm—Hahn Loeser & Parks, LLP; Robert J. Clark

(57) ABSTRACT

A third hand stand also referred to as a tire jack for enabling a single person to position and hold the tire/wheel assembly in the proper position while replacing the tire/wheel assembly on the swing arm or frame a motorcycle. The tire jack comprises a tire support, a lever, a sleeve for connecting the tire support to the lever at a position offset from a longitudinal centerline of the tire support, wherein the tire support is oriented transverse to the lever. The tire jack is operated by positioning the tire support of the tire jack underneath the tire/wheel assembly and moving the lever such that the tire/wheel assembly is elevated and moved laterally until the tire/wheel assembly is properly aligned with the swing arm. The tire/wheel assembly is then attached to the motorcycle.

15 Claims, 4 Drawing Sheets

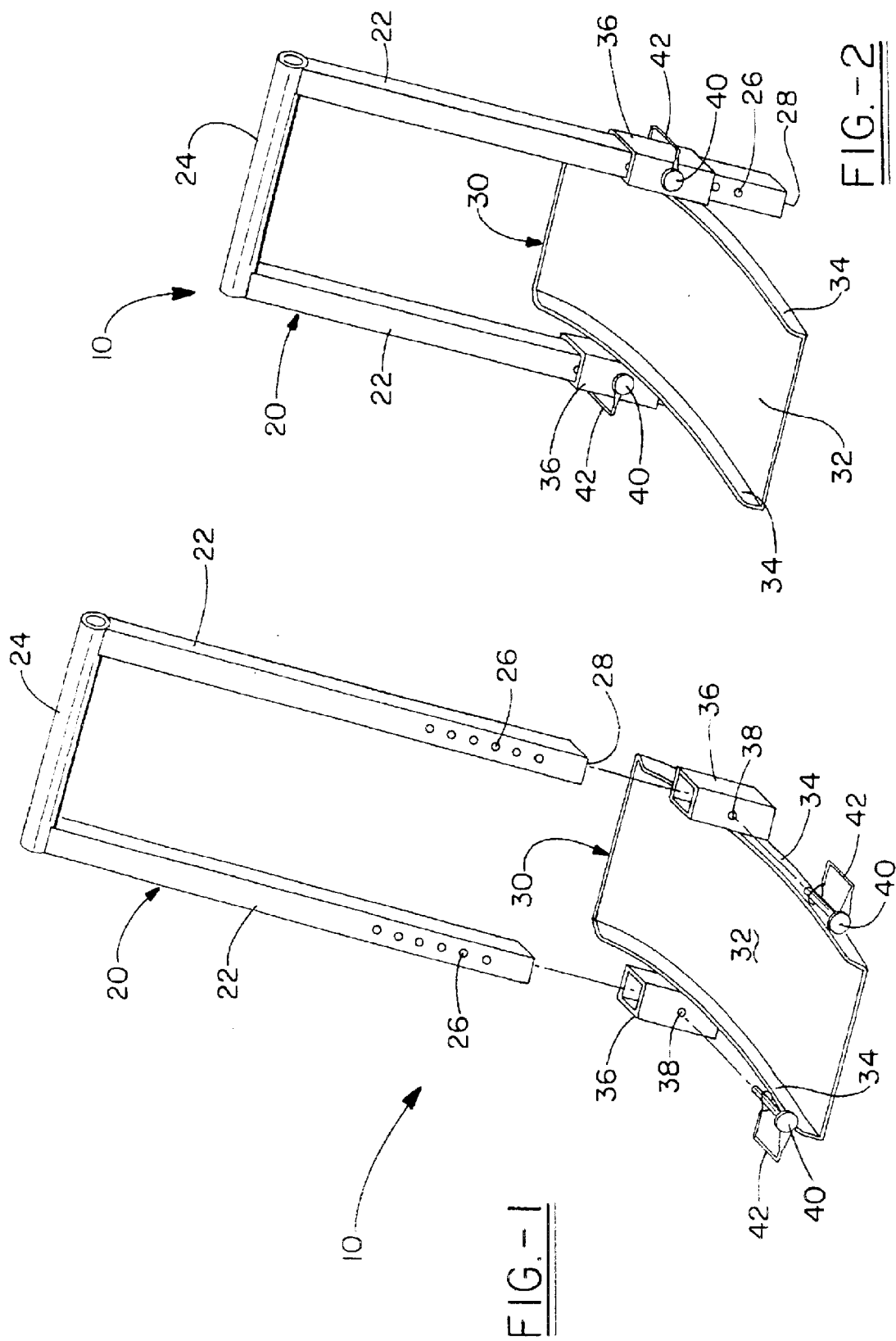

THIRD HAND STAND AND METHOD OF USING THE SAME

FIELD OF THE INVENTION

The present invention relates generally to motorcycle repair supports or lifts; and, more particularly, to a third hand stand or tire jack device for adjustably supporting a motorcycle tire/wheel assembly while reassembling a rear wheel onto the swing arm or frame of a motorcycle. The tire jack easily enables proper alignment of the wheel while allowing the user to have at least one hand free to insert the axle through the wheel to reattach the tire/wheel assembly to the motorcycle.

BACKGROUND OF THE INVENTION

The popularity of motor-driven vehicles, such as motorcycles, minibikes, trail bikes and the like continues to rise. Repair costs of these vehicles, collectively referred to as motorcycles, also continues to rise. Proper care through preventative maintenance is important in keeping the motorcycle in top running condition. Some of the maintenance can be carried out by the motorcycle owners and, thus, these owners can save the cost of taking the vehicle to a professional such maintenance. These preventive maintenance measures may include minor repairs, such as replacing tires, bearings, brakes, chains, etc.

However, in all of the foregoing, it is necessary to have the motorcycle supported in a steady upright manner. Special stands have been developed that hold and elevate the front and/or rear frame or swing arm so that the wheels can be easily removed and maintenance performed. The stands allow the owner/mechanic to use both hands on the repair job without worrying about the motorcycle support. However, the stands can also cause problems when the mechanic is attempting to reinstall a removed wheel, especially a rear position wheel. The stands elevate the frame of the motorcycle such that the tire/wheel assembly must be lifted to be reinstalled on the swing arm or frame. The mechanic has to support the tire/wheel assembly in the vertical direction against the weight of the tire/wheel assembly and support the tire/wheel assembly in the longitudinal direction against any chain tension, all the while trying to properly install the axle and various spacers and bearings. The tire/wheel assembly can be quite heavy and typically includes the wheel, an inflated tire, attached sprocket, brake disc, bearings, flanges, collars, nut, bolts, and other miscellaneous hardware, as well as the attached chain. This makes replacing the rear wheel virtually impossible for the lone mechanic.

Accordingly, there is a need for an apparatus and method for enabling a single person to position and hold the tire/wheel assembly in the proper position while replacing the tire/wheel assembly on the swing arm or frame of a motorcycle.

SUMMARY OF THE INVENTION

The present invention overcomes the limitations of the prior art by providing a third hand stand, also known as a tire jack, comprising a tire support, a lever, a means for connecting the tire support to the lever at a position offset from a longitudinal centerline of the tire support, wherein the tire support is oriented transverse to the lever.

The present invention also overcomes the limitations of the prior art by providing a method of installing an axle through a rear wheel and a swing arm of a motorcycle to attach the wheel to the motorcycle. The method comprises the steps of providing a tire jack comprising a tire support, a lever, a means for connecting the tire support to the lever at a position offset from a longitudinal centerline of the tire support; positioning the tire support of the tire jack underneath the rear wheel; moving the lever such that the rear wheel is elevated and moved laterally until the wheel is properly aligned with the swing arm; and inserting the axle through the swing arm and the wheel to attach the wheel to the motorcycle.

BRIEF DESCRIPTION OF THE DRAWINGS

Better understanding of the present invention will be had when reference is made to the accompanying drawings, wherein identical parts are identified with identical reference numerals, and wherein:

FIG. 1 is an exploded perspective view of the tire jack of the present invention.

FIG. 2 is a perspective view of the assembled tire jack of the present invention.

DETAILED DESCRIPTION OF THE DRAWINGS

Figure 3:
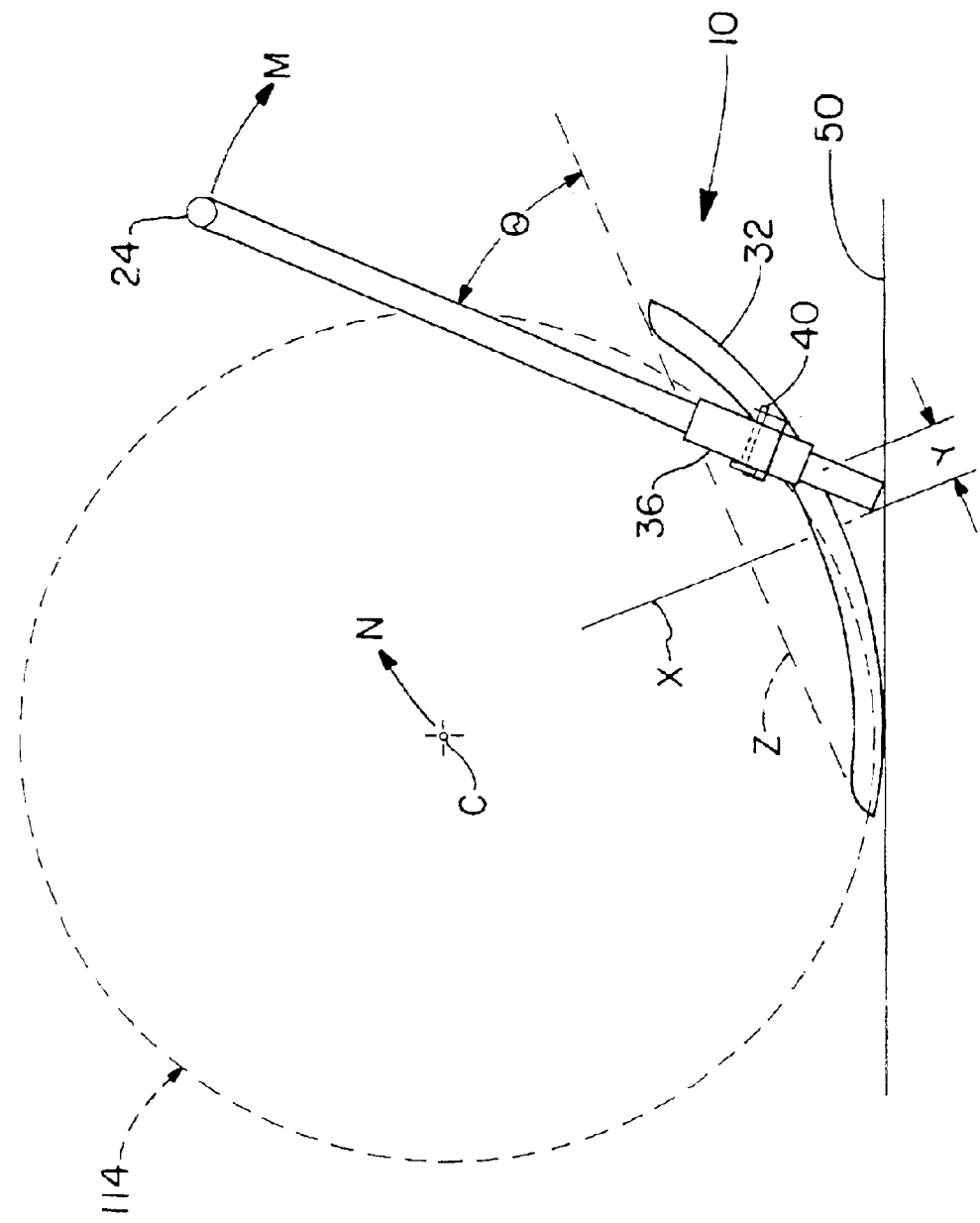
FIG. 3 is a side elevational view of the apparatus of the present invention as shown in FIG. 2 positioned on the floor and having a tire/wheel assembly shown in phantom.

Referring now to FIG. 1, the third hand stand also referred to as a tire jack device 10 of the present invention is shown in an exploded view. Tire jack 10 comprises a lever portion 20 and a tire support portion 30. The lever 20 is generally U-shaped having two arms 22 generally parallel to each other and attached to opposite ends of a handle 24. Each of the arms 22 has at least one aperture 26 formed therethrough at a predetermined distance from a first end 28 of the arms 22 opposite the handle 24.

The tire support 30 has a cradle 32 generally curved along a radius and having upstanding walls 34. The cradle 32 is formed to receive a tire of a motorcycle tire/wheel assembly. The upstanding walls 34 ensure that the tire is properly centered on the cradle 32 and prevent the tire from moving off the side of the cradle 32. A sleeve 36 is fixedly attached to each of the upstanding walls 34 and are formed to receive the arms 22 of lever 20. The sleeves 36 are positioned rearward of the center of the cradle 32 and are attached at a predetermined angle with respect to the cradle 32 as best shown and discussed in greater detail below with respect to FIG. 3. An aperture 38 is formed through each sleeve 36.

The lever portion 20 is attached to the tire support portion 30 by a fastener or pin 40 positioned through aperture 38 in each sleeve 36 and a corresponding aperture 26 in arms 22 as best shown in the assembled tire jack 10 in FIG. 2. The pins 40 may also include a pin retaining mechanism 42 shown herein as a locking wire retainer 42. The pin retaining mechanism 42 prevents the pin 40 from falling out of the sleeves 36 during use. Other pin retention mechanisms 42 are also contemplated such as a spring loaded detent, cotter pin, etc., and the invention is not intended to be limited to the locking wire retainer 42 shown.

The arms 22 may have a plurality of apertures 26 such that the tire support 30 may be adjustably connected at different positions along the arms 22. The adjustability of the tire jack 10 allows it to be optimized to different heights which may be needed and will be discussed in more detail below. It is also contemplated that the lever 20 and the tire support 30 may be adjustably attached by any number of known methods such as a clamp, removable fasteners, etc. It is also contemplated that the lever 20 is fixably connected to the tire support 30 by welding or the like. This may be desirable when the operator only uses the tire jack 10 for a specific application at a known height.

Tire jack 10 may be made of any suitable material such as, but not limited to, aluminum, steel, or even plastic. The size of tire jack 10 may also vary. The size of the tire jack 10 is preferably optimized to work within the confines of a standard rear lift, such as the rear swing arm stand 140 shown in FIG. 4. In one embodiment the preferred length of the arms 22 is typically around twenty-four inches with a cradle 32 arc length of about eighteen to twenty inches. The cradle 32 is typically about seven to nine inches wide. However, the tire jack 10 is not intended to be limited to any particular size or length.

Figure 4:
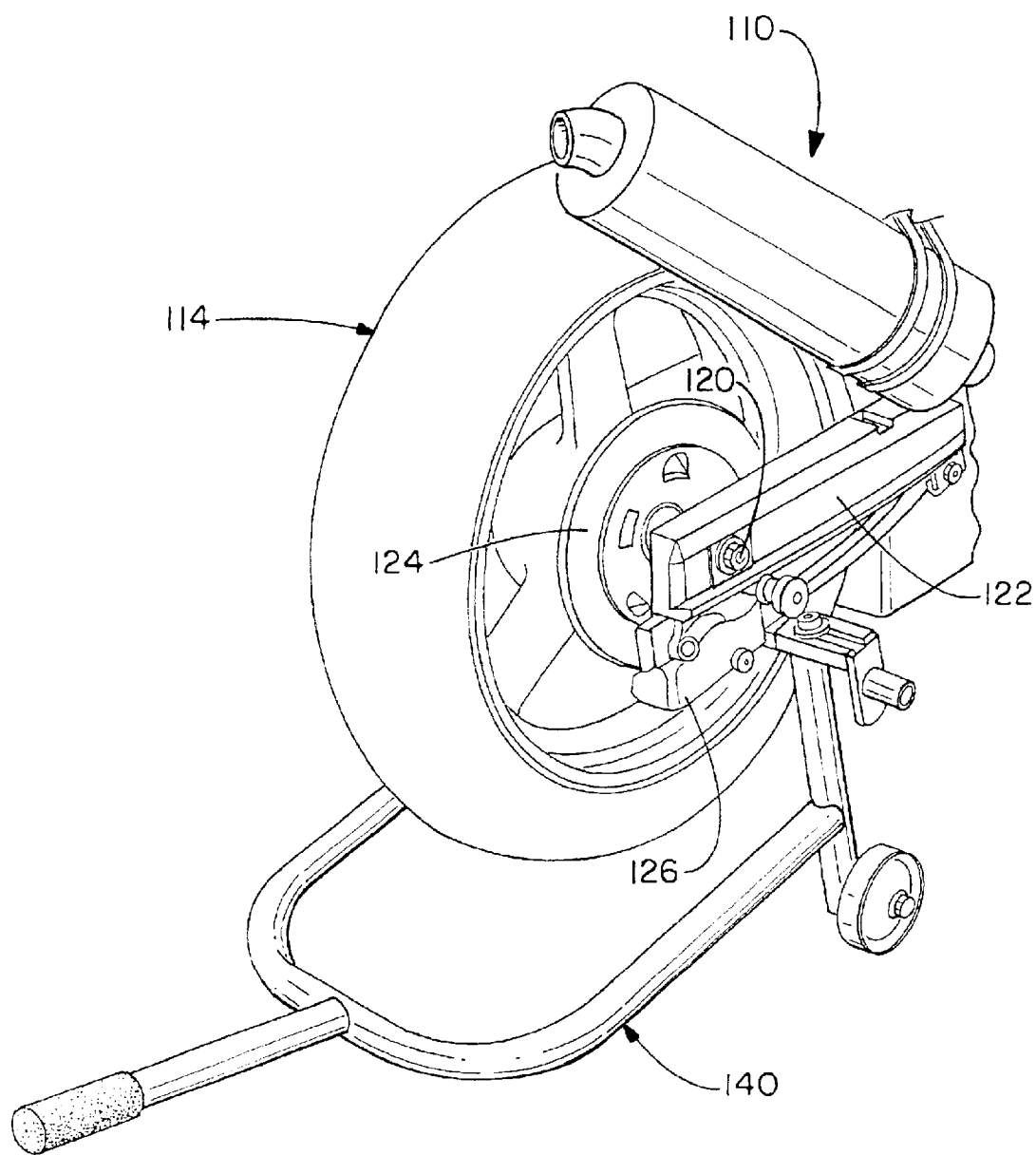
FIG. 4 is a perspective view of the rear of a motorcycle having the swing arm supported by a standard rear swing arm stand.
Figure 5:
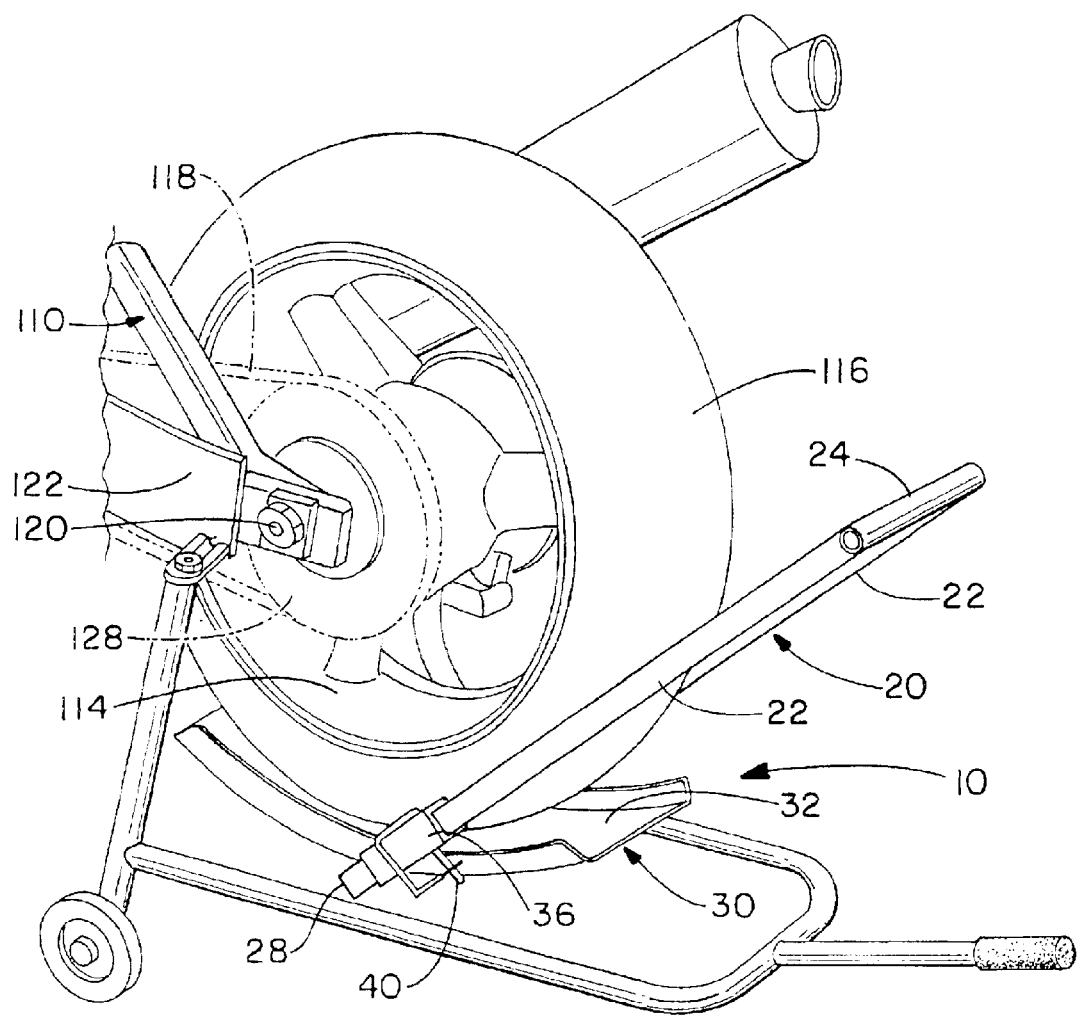
FIG. 5 is a perspective view of the rear of a motorcycle having the swing arm supported by a standard rear swing arm stand with the tire jack of the present invention shown.

The operation of the tire jack 10 is best shown with regard to FIG. 3 wherein a side elevational view of the tire jack 10 is shown with a motorcycle tire/wheel assembly 114 shown in phantom. The tire jack 10 is positioned on floor 50. Sleeves 36 are offset and mounted a predetermined distance Y from the centerline X of the cradle 32. The sleeves are also oriented at an angle θ from the chord Z between the ends of the cradle 32, which could also be measured from a tangent line at centerline X of the cradle 32. Angle θ is not limited to a particular angle although an angle between 30 and 60 degrees and particularly about 45 degrees has been used successfully. The orientation of the sleeves 36 has a dual purpose in that they allow the handle 24 to be accessibly positioned generally rearward of the tire/wheel assembly 114 while the cradle 32 is underneath the tire. The offset Y results in the tire jack 10 not only elevating the tire/wheel assembly 114, but also moving the tire/wheel assembly 114 rearward. Accordingly, when the handle 26 of tire jack 10 is pushed downward and rearward as shown at M, the center C of the wheel moves upward and rearward as shown at N. It is noted that the handle 26 is typically a greater distance from end 28 than the point of contact of the tire on the cradle 32. This allows relatively large movement of the handle 26 to result in smaller movement of the tire/wheel assembly 114. In operation, this makes it easier to accurately align the tire/wheel assembly 114 with the swing arm of the motorcycle. Referring now to FIGS. 4 and 5, these drawings show the relationship of recited parts involved in the methods described. The typical method for reattaching the tire/wheel assembly 114 involves the following steps in relation to a motorcycle 110 supported on a rear swing arm stand 140 and having its rear tire/wheel assembly 114 removed. The rear tire/wheel assembly 114 is moved into position underneath the motorcycle 110 and lined up such that the brake disk 124 lines up with the back plate of the caliper 126. The rear tire/wheel assembly 114 is positioned forward such that the chain 118 can be slipped over the sprocket 128. The bearings (not shown) are replaced in the wheel hub of the tire/wheel assembly 114. At this point the rear wheel is ready for assembly onto the swing arm 122. The rear tire/wheel assembly 114 must be elevated and held in position against the weight of the tire/wheel assembly 114 pulling the wheel downward and the tension of the chain 118 pulling the tire/wheel assembly forward. At this point, a second person is typically required to support the tire/wheel assembly 114 in the proper aligned position while the first person inserts the axle 120 through the swing arm 122, spacers, bearings and wheel. Other methods involve using pieces of wood to hold the tire/wheel assembly 114 at the proper height; however, this method still requires the repairman to use his hands to hold the tire/wheel assembly 114 in place to prevent chain tension from moving the tire/wheel assembly 114 out of alignment. Also finding pieces of wood to elevate the tire/wheel assembly 114 to the exact proper alignment height often proves difficult for most operators.

By using the present invention, the method of reattachment is simplified. Using the same method described above, the following steps are completed at the point where the rear tire/wheel assembly 114 is ready for assembly on the swing arm 122. Referring now to FIG. 5 and using the method of the present invention, the rear tire/wheel assembly 114 is lifted up and the tire jack 10 is positioned underneath the tire 116 of the rear tire/wheel assembly 114 such that the tire 116 is placed on the cradle 32 of the tire jack 10. It is noted that the arms 22 of the tire jack 10 straddle the tire/wheel assembly 114. The operator pushes the handle 24 of the tire jack 10 generally downward, causing the tire jack 10 to rotate about ends 28 of the arms 20. As the cradle 32 rotates about ends 28, the tire/wheel assembly 114 is elevated vertically and also moved rearward against the tension of the chain 118. If necessary, the operator can slide the ends 28 of the tire jack 10 forward or rearward to obtain proper alignment. If the proper vertical height cannot be achieved, the tire jack 10 is removed and the tire support 30 adjusted upwards or downwards on lever 20 as needed. Once the operator has the wheel assembly properly aligned, the operator can use one hand, or even a knee or leg, to maintain the proper force on the handle 24 of the tire jack 10 to retain the wheel in alignment. This enables the operator to have both hands free to insert the axle 120 through the swing arm 122, spacers, bearings and wheel and properly attach the tire/wheel assembly 114 to the swing arm 122 of the motorcycle 110. Inserting the axle 120 is often difficult and may require the use of a hammer to force the axle 120 into position. Thus the ability to use one or two hands is even more important.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A tire jack comprising:
   a tire support comprising a tire cradle, the tire cradle formed longitudinally generally along an arc and laterally extending transverse to the longitudinal arc;
   a lever;
   a means for connecting the tire support to the lever at a position offset from a longitudinal centerline of the tire support;
   wherein the tire jack is pivotable about an axis perpendicular to the longitudinal centerline of the tire support and perpendicular to a chord extending from opposite longitudinal ends of the tire cradle.

2. The tire jack of claim 1, wherein the tire support comprises an upstanding wall at either lateral end of the tire cradle.

3. The tire jack of claim 1, wherein the tire support further comprises a sleeve formed to receive at least a portion of the lever.

4. The tire jack of claim 1, wherein the tire support further comprises a sleeve attached to each side of the tire cradle at an angle in the range of 30 to 60 degrees with respect to a line tangent to the tire cradle at the longitudinal centerline of the tire support.

5. The tire jack of claim 1, wherein the lever is generally "U" shaped having two arms formed generally parallel to each other and having a handle therebetween.

6. The tire jack of claim 5, wherein the a tire cradle comprises an upstanding wall at either lateral end of the tire cradle, and a sleeve attached to each upstanding wall, wherein each sleeve is formed to receive one of the two arms of the lever.

7. The tire jack of claim 6, wherein each arm has at least one aperture therethrough and each sleeve has at least one aperture therethrough, and the means for adjustably attaching each sleeve to one of the two arms comprises a pin positioned through the apertures of the arms and the sleeves.

8. The tire jack of claim 7, wherein each pin further comprises a pin retaining mechanism.

9. The tire jack of claim 8, wherein the pin retaining mechanism comprises a pin locking wire.

10. A tire jack for a motorcycle tire/wheel assembly having a rotational axis, the jack comprising:
   a lever having two arm portions formed generally parallel to each other and each arm connected at a first end to a handle;
   a tire support comprising a tire cradle formed longitudinally as a radius and laterally as a plane, an upstanding wall at either lateral end of the tire cradle, and a sleeve attached to each upstanding wall, wherein each sleeve is formed to receive one of the two arms of the lever;
   a means for adjustably attaching each sleeve to one of the two arms such that a second end of each arm protrudes through each sleeve and the second arm ends form a pivot axis for the tire jack, the pivot axis being parallel to the rotational axis of the of the motorcycle tire/wheel assembly.

11. The tire jack of claim 10, wherein the lever is attached to the tire support at a predetermined distance from the longitudinal centerline of the tire cradle.

12. The tire jack of claim 10, wherein each arm has at least one aperture therethrough and each sleeve has at least one aperture therethrough, and the means for adjustably attaching each sleeve to one of the two arms comprises a pin positioned through the apertures of the arms and the sleeves.

13. The tire jack of claim 12, wherein each pin further comprises a pin retaining mechanism.

14. The tire jack of claim 11, wherein each sleeve is attached to the tire cradle at an angle in the range of 30 to 60 degrees with respect to a line tangent to the tire cradle at the longitudinal centerline of the tire support.

15. A method of installing an axle through a rotational axis of a tire/wheel assembly and a swing arm of a motorcycle having a drive chain, to attach the tire/wheel assembly to the motorcycle, the method comprising the steps of:
   providing a tire jack comprising a tire support, a lever, a means for connecting the tire support to the lever along an axis perpendicular to the longitudinal component at a position offset from a longitudinal centerline of the tire support;
   positioning the tire support of the tire jack underneath the tire/wheel assembly;
   moving the lever such that the tire jack pivots about an axis parallel to the rotational axis of the tire/wheel assembly such that the tire/wheel assembly is moved until the tire/wheel assembly is properly aligned with the swing arm and such that the movement of the lever compensates for any tension of the drive chain;
   inserting the axle through the swing arm and the tire/wheel assembly to attach the wheel to the motorcycle.

* * * * *